(12) United States Patent
Robert et al.

(10) Patent No.: US 7,691,524 B2
(45) Date of Patent: Apr. 6, 2010

(54) ANODE MATERIAL FOR A HIGH TEMPERATURE FUEL CELL

(75) Inventors: Gilles Robert, Zurich (CH); Andreas Franz-Josef Kaiser, Roskilde (DK); Emad Batawi, Mountain View, CA (US)

(73) Assignee: Hexis AG, Winterthur (CH)

( * ) Notice: Subject to any disclaimer, the term of this patent is extended or adjusted under 35 U.S.C. 154(b) by 1309 days.

(21) Appl. No.: 11/081,351

(22) Filed: Mar. 15, 2005

(65) Prior Publication Data

US 2006/0083979 A1    Apr. 20, 2006

(30) Foreign Application Priority Data

Mar. 29, 2004    (EP) .................................. 04405189

(51) Int. Cl.
*H01M 4/00* (2006.01)
*H01M 8/10* (2006.01)
*H01M 4/58* (2006.01)

(52) U.S. Cl. .............................. 429/44; 429/30; 429/40; 429/218.1; 429/223

(58) Field of Classification Search .................... 429/30, 429/40, 44, 218.1, 223
See application file for complete search history.

(56) References Cited

U.S. PATENT DOCUMENTS 5,676,806 A * 10/1997 Van Berkel et al. ......... 204/242
6,017,647 A    1/2000 Wallin

FOREIGN PATENT DOCUMENTS

DE    19819453 A1    11/1999
EP    0955685 A1    11/1999
EP    1343215 A1    9/2003

* cited by examiner

*Primary Examiner*—Patrick Ryan
*Assistant Examiner*—Julian Mercado
(74) *Attorney, Agent, or Firm*—Townsend and Townsend and Crew, LLP

(57) ABSTRACT

Anode material for a fuel cell which is to be operated at a high temperature above 700° C., which anode material is a porous composite material with a heterogeneous phase of solid materials which is formed by two reticular systems which penetrate each other in interlaced manner of particles connected by sintering, namely a first reticular system of ceramic material, and also a second reticular system of metallic material for the purpose of bringing about redox processes and an electrical conductivity, characterized in that the first reticular system is composed of large and small ceramic particles (10, 11) with average diameters $d_{50}$ greater than 5 μm or smaller than 1 μm respectively, in that 50% to 80% of the first reticular system is formed from the large ceramic particles (10), and in that a composition of the anode material to be used is given by values which are selected by means of samples of this material and a test method, wherein the test method includes at least one redox cycle, an irreversible change in length of the selected sample adopting in this a value smaller than 0.002, preferably smaller than 0.0005, and the following measurements and evaluations being carried out per redox cycle at a temperature which is at least the same as the operating temperature of the fuel cell:

A linear elongation of the sample is measured in the oxidized state of the second reticular system and a value $L_1$ is determined.

The second reticular system is reduced, is oxidized again after at least one hour, and a value $L_2$ of the linear elongation is determined for the newly oxidized state.

One obtains the specific value of the irreversible change in length as the ratio $(L_1-L_2):L_1$.

18 Claims, 2 Drawing Sheets

ANODE MATERIAL FOR A HIGH TEMPERATURE FUEL CELL

BACKGROUND OF THE INVENTION

The invention relates to an anode material for a fuel cell which is to be operated at a high temperature above 700° C., namely to an anode material. The invention also relates to fuel cells with such an anode material. In such fuel cells the anode layer can be applied onto a carrier structure, with an electrolyte layer in particular being formed as a carrier. Or a carrier structure for a thin electrolyte layer is manufactured from the anode material. In the first case, a cathode layer or a foam-like metal layer can be used as a carrier structure instead of the electrolyte layer.

An SOFC fuel cell with a fuel-side carrier structure is known from EP-A-1 343 215 which forms an anode substrate and which serves as a carrier for a thin film electrolyte and also a cathode. In the contact region between the anode, which is a thin part layer of the carrier structure, and the electrolyte, electrochemical reactions take place, at so-called three phase points (nickel/solid electrolyte/gas), in which the nickel atoms are oxidized by oxygen ions ($O^{2-}$) of the electrolytes and these are then reduced again by a gaseous fuel ($H_2$, CO), with $H_2O$ and $CO_2$ being formed and electrons freed during oxidation being conducted further by the anode substrate. EP-A-1 343 215 describes a carrier structure which has a "redox stability" and which with reference to this redox stability is sufficiently well designed with regard to gas permeability and also economics for a use in high temperature fuel cells.

The carrier structure of these known fuel cells is made up of an electrode material and contains macro-pores, which are produced by means of pore formers and form the communicating cavities. The electrode material includes skeleton-like or net-like continuous structure of particles joined by sintering, so-called "reticular systems" (can also be termed percolating phases) which form two interlaced systems: a first reticular system made of ceramic material and a second reticular system which contains metals or one metal—Ni in particular—and which produces an electrically conductive connection through the carrier structure. The electrode material has the characteristics that during the carrying out of redox cycles by means of the change between oxidizing and reducing conditions firstly no substantial changes of characteristic occur in the ceramic reticular system and secondly an oxidation or rather reduction of the metal results in the other reticular system. Moreover, the two reticular systems together form a dense structure which contains micro-pores in the oxidized condition, the proportion of which in relation to the volume of the electrode material is, or can be, smaller than 5% related to the volume of the electrode material.

The two reticular systems arise in a natural way from the constituent particles in the form of a statistical distribution of the particles, if these are prepared in such a way that the two kinds of particles respectively exhibit a narrow size spectrum, when the proportion for each reticular system amounts to 30% per unit volume and when the particles are mixed with each other homogeneously. The system of communicating cavities formed by the macro-pores is likewise a reticular system. This hollow cavity system results in the necessary gas permeability.

The carrier structure described may show the desired redox stability, however in other respects it shows deficiencies. During a redox cycle the structure contracts during the transition from the oxidized state to the reduced state (constriction); the electrolyte layer is correspondingly placed under a compressive pressure. The compression is followed by an expansion during the reversed redox transition. This expansion is greater than the compression by more than 0.01% due to irreversible processes in the carrier structure in many of the anode substrates. Cracks develop in the electrolyte layer, which represents a gas separating membrane, due to the expansion through which the necessary gas tightness is lost.

SUMMARY OF THE INVENTION

An object of the present invention is to provide an anode material for a high temperature fuel cell which is suitable for pairing with an electrolyte layer in which both a connection between the different materials is adequately durable, and also the gas tightness of the electrolyte layer is present. This object is satisfied by the porous composite material with a heterogeneous phase of solid materials which is formed by two reticular systems which penetrate each other in interlaced manner of particles connected by sintering.

The anode material is provided for a fuel cell which is to be operated at a high temperature above 700° C. The anode material is a porous composite material with a heterogeneous phase of solid materials which is formed by two reticular systems, which penetrate one another in interlaced manner, of particles connected by sintering. A first reticular system consists of ceramic material. A second reticular system contains metallic material with which redox processes and an electrical conductivity are brought about. The first reticular system is composed of large and small ceramic particles with average diameters $d_{50}$ greater than 5 μm or smaller than 1 μm. 50% to 80% of the first reticular system is formed from the large ceramic particles. A composition of the anode material to be used is given by values which are selected by means of samples of this material and a test method. In this respect, the test method includes at least one redox cycle. An irreversible change in length of the selected sample, which results during the test method, adopts a specific value smaller than 0.002, preferably smaller than 0.0005. Per redox cycle the following measurements and evaluations are to be carried out at a temperature which is at least the same as the operating temperature of the fuel cell:

A linear elongation of the sample is measured in the oxidized state of the second reticular system and a value $L_1$ is determined.

The second reticular system is reduced, is oxidized again after at least one hour, and a value $L_2$ of the linear elongation is determined for the newly oxidized state.

One obtains the specific value of the irreversible change in length as the ratio $(L_1-L_2):L_1$.

The anode material of the invention can likewise be used with advantage for high temperature fuel cells in which, for example, the electrolyte layer is formed as a carrier and in which the anode layer is applied to this layer. The special structure of this material forms an effective means against the occurrence of shear forces which are too large, which occur due to the volume difference between the reduced state and the oxidized state of the anode material at the boundary surface between the anode layer and the electrolyte layer and which can cause a de-lamination.

BRIEF DESCRIPTION OF THE DRAWINGS

The invention will be explained with reference to the drawings, which show.

DESCRIPTION OF THE PREFERRED EMBODIMENTS

Figure 1:
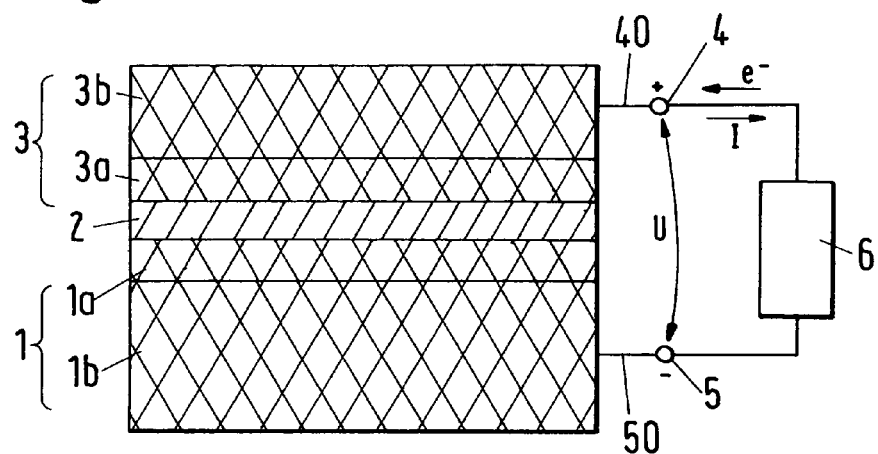
FIG. 1 shows a fuel cell in a schematic illustration.

In a high temperature fuel cell as schematically illustrated in FIG. 1, electrode reactions are carried out to produce an electrical current 1, namely reducing reactions in an anode layer 1a, which is part of a carrier structure 1; and oxidizing reactions on a cathode 3 which is composed of an electrochemically active electrode layer 3a and a second part layer 3b. A larger part 1b of the carrier structure 1 is formed by porous, gas permeable reticular systems. Water and carbon dioxide arise in the anode layer 1a from hydrogen and carbon monoxide which form the gaseous fuel. At the cathode 3 molecular oxygen of a second gas flow (air for example) reacts to ionic oxygen $O^{2-}$—while taking up electrons $e^-$ from a metallic conductor 40 which produces a connection to a pole 4. The oxygen ions move through a solid material electrolyte 2 which forms a thin, gas-tight sintered electrolyte layer. This separates the two electrode layers 1a and 3a in a gas-tight manner; it is conductive for the oxygen ions at temperatures over 700° C. The reducing anode reaction takes place with the oxygen ions with the donation of electrons to a further metallic conductor 50 which produces a connection to a pole 5.

A consumer 6 which loads the fuel cell with an electrical resistance is arranged between the poles 4 and 5. In the practical use of the fuel cell the voltage U between the poles 4 and 5 is produced by a stack of cells connected in series.

The carrier structure 1, for which anode material in accordance with the invention is used, consists of the anode layer 1a and of the second part layer 1b. The part layer 1b includes a heterogeneous phase of solid materials and hollow cavities in the form of macro-pores and also micro-pores. The anode layer 1a is distinguished from the part layer 1b in that it does not contain any macro-pores. The pores result in the gas permeability of the carrier structure 1. The heterogeneous phase of the anode layer 1 and of the part layer 1b contains two part phases, namely the first reticular system and also the second reticular system, which penetrate one another in interlaced manner. The first part phase—namely the first reticular system—consists of a ceramic material and the second part phase—the second reticular system—has metal for which a redox cycle can be carried out with complete reduction and renewed oxidation. The second part phase produces, when the metal is present in reduced form, an electrically conductive connection through the carrier structure 1.

Figure 2:
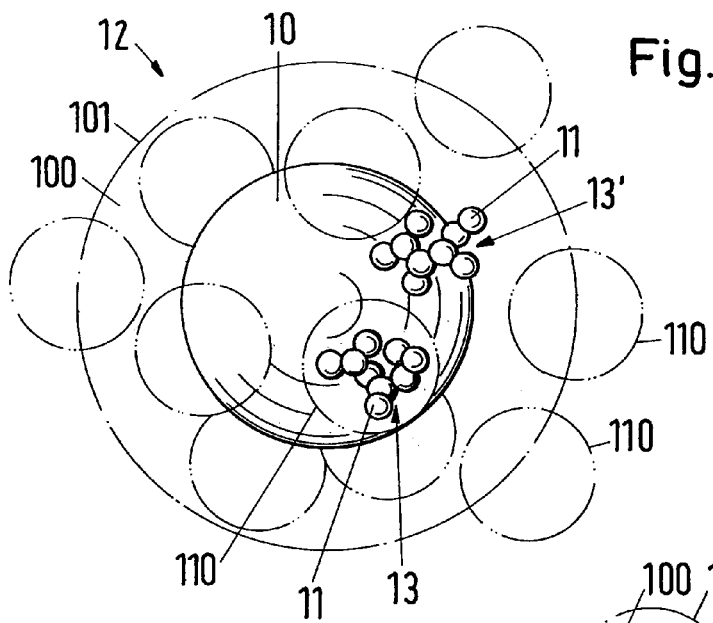
FIG. 2 is an illustration of a structure designated a "burr corpuscle", which ensures favorable structural characteristics in an anode material in accordance with the invention.

The first part phase is composed of large and small ceramic particles 10 and 11 from which inherently stable "burr corpuscles" 12 and 13 are formed as islands in the heterogeneous phase: see FIG. 2. The large ceramic particles 10 have an average diameter $d_{50}$ larger than 5 or 10 μm; this diameter is preferably approximately 20 μm. The average diameter $d_{50}$ is less than 1 μm for the small ceramic particles.

The second part phase forms an approximately homogeneous matrix together with the small ceramic particles 11 of the first part phase. The large ceramic particles 10 are uniformly embedded in this matrix. The particle density of the small ceramic particles 11 is selected in such a manner that clusters each including a plurality of particles 11 occur. On sintering of the carrier structure the particles 11 form into inherently stable structures 13 or 13' in the clusters. Moreover, on sintering, one of these structures, that is, the structure 13' with the large ceramic particles 10, joins into "large burr corpuscles" 12. A large burr corpuscle 12 of this kind is composed of a core which consists of a large ceramic particle 10 and a halo 100 in which the joined-on structures 13' are located. The average extension of the halo 100 is given by the sphere 101 drawn in chain-dotted lines in FIG. 2. The larger the particle density of the small ceramic particles 11 is selected to be, the larger the diameter of the sphere 101. This diameter also depends on the size of the small ceramic particles 11. In other words it depends on the particle density of the small ceramic particles 11 and also on the diameters of the large and small ceramic particles 10 and 11.

Apart from the burr corpuscle 12, small spheres 110 are also drawn in chain-dotted lines in FIG. 2. These spheres are associated with the structures 13 which are not connected to the large ceramic particles 10. The diameters of the spheres 110 likewise grow with increasing particle density of the small ceramic particles 11. If this particle density exceeds a critical size, the small ceramic particles 11 join together to a percolating phase in which the spheres 110 have united to a single composite action. The particle density of the small ceramic particles 11 and also their size are selected so that the spheres 110 have markedly smaller diameters than the spheres 101. The associated structures 13 which are located inside the above-named matrix will be termed "small burr corpuscles" 13 in the following.

Figure 3:
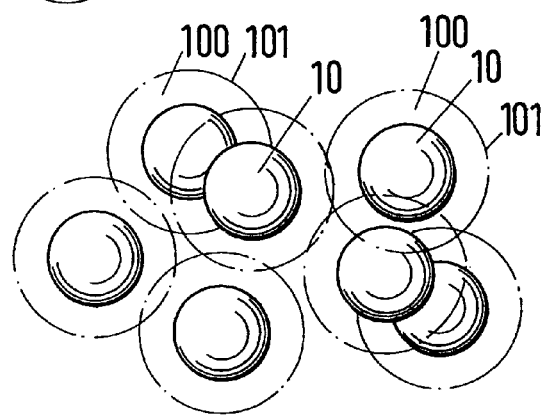
FIG. 3 is an illustration of the term "adhesive burr composite"

The quantity ratios of the ceramic particles are selected in such a way that the burr corpuscles 12, 13 associate themselves to an "adhesive burr composite", through which the carrier structure 1 is stabilized against changes in stability: see FIG. 3. Changes in stability can result during reduction of the second part phase. In this process which is associated with a constriction, the particles which are initially composed of metal oxide are movable. They rearrange themselves wherein the macroscopic shape of the carrier structure 1 can change. A change in shape of this kind is severely limited by the stabilization. This results from the structures 13' becoming hooked up in the halos 100 when the large burr corpuscles 12 are arranged so close together that halos 100 of neighboring burr corpuscles 12 overlap. The small burr corpuscles 13 likewise contribute by hooked engagement to the adhesion between the large burr corpuscles 12. In the reduction of the second part phase the carrier structure can only contract in a very limited manner thanks to the adhesive burr composite. The burr corpuscles 12 and 13, which are associated due to hooked engagements, form a composite (the adhesive burr composite) which is very flexible with regard to small elongations and only allows small stresses to arise. The electrolyte layer which is relatively rigid is thus only loaded with weak tensile forces by the carrier structure 1 in which the second part phase only displays a fluid-like behavior during the constriction process.

The carrier structure is also correspondingly stabilized by the adhesive burr composite during oxidation. By means of this stabilization the metric characteristics of the carrier structure 1 at the boundary surface to the electrolyte layer 2 are largely maintained. Volume changes of the second part phase during the redox cycle thus leave the gas tightness of the electrolyte layer substantially intact so that the efficiency of the fuel cells is maintained; or the gas tightness is only impaired to the extent that a tolerable loss of efficiency results.

Shear forces also arise between the anode layer and the electrolyte layer, when the oxidation condition of the anode material changes. Due to the adhesive burr composite these shear forces are relatively weak. When the anode layer is applied to an electrolyte layer used as a carrier, shear forces of this kind do not, as a rule, suffice to cause a de-lamination of the anode layer.

Figure 4:
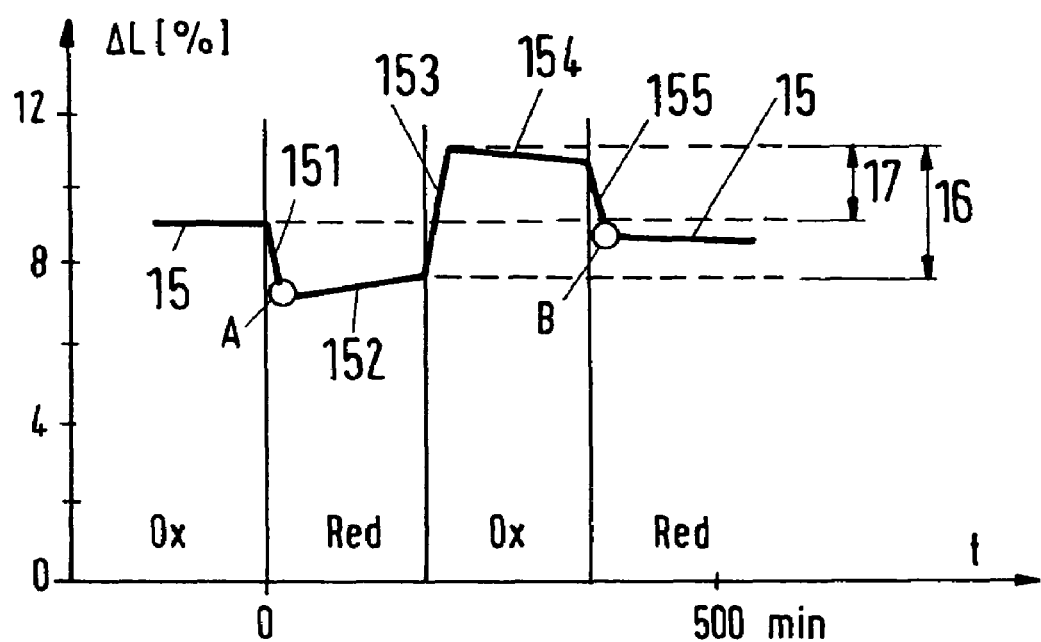
FIG. 4 is a diagram showing the constriction and expansion of a sample during a redox cycle.

The characteristic of the anode material of the invention that the large and small ceramic particles 10, 11 form "burr corpuscles" 12, 13 of stable shape which are associated into a "adherent burr composite", which stabilizes against changes of shape, can only be proven with difficulty with respect to the composition. The fact that such characteristics are, however, present can be indirectly determined by means of a test method which will be explained with reference to FIG. 4:

FIG. 4 shows how the linear extension L of a sample—graph section 15—changes during a redox cycle. The change in length ΔL is given on the abscissa which initially has the value which results through the heating up to the operating temperature of the fuel cell of 800° C. and at oxidating conditions (in the ordinate range "Ox"). At reducing conditions due to a hydrogen atmosphere a constriction results with a length reduction on the graph section 151 to the point A (in the ordinate range "Red"). The metal of the sample is reduced at this point A. Subsequently—graph section 152—the length in the reduced condition increases again slightly, probably due to relaxation processes in which elastic tensions are released. If the hydrogen is replaced with air, then the linear extension L increases again (graph section 153) and moreover more than the length had decreased during the reduction. In the oxidized condition a small alteration in length takes place, possibly also due to relaxation phenomena: graph section 154. During renewed reduction the linear extension L becomes shorter again: graph section 155, point B. At point B the redox cycle begun at point A is complete. The two points A and B should lie at the same height if only reversible processes occur during the redox cycle. As can be seen from FIG. 5, an irreversible extension is present.

The extensions which have arisen due to the oxidation are illustrated in FIG. 4 with the double arrows 16 and 17. The double arrow 17 refers to the irreversible elongation which is associated with a redox cycle. The irreversible extension 17 should be as small as possible for a suitable anode substrate. This requirement is an expedient criterion in the search for suitable compositions. A search using these selection criteria has been carried out with a plurality of samples.

The anode substrate which comprises the heterogeneous phase 1b contains zirconium oxide YSZ stabilized with Y in the first part phase and Ni as a metal in the second part phase. The second part phase consists wholly or largely of NiO particles adhered joined together by sintering, when the metal is present in oxidized form. The matrix between the large ceramic particles 10 has a heterogeneous grain structure with regard to the NiO particles and the small ceramic particles 11. For samples which have been examined, the composition of which has proved to be advantageous, the particle size ratio of the heterogeneous grain structure is in the range between 2:1 and 5:1; in this arrangement the NiO particles have an average grain size $d_{50}$ in the range of 0.5 to 2 μm. The quantity ratio between the first and the second part phase lies—in percent by weight—in the range from 50:50 to 25:75, preferably at approximately 40:60.

In a particularly advantageous sample the length of the double arrow 17 has practically disappeared in the diagram of FIG. 4. This sample is characterized by the following parameters: 60% by weight and $d_{50}$=0.74 μm for NiO, 40% by weight and $d_{50}$=0.2 and 20 μm respectively for YSZ using two parts coarse YSZ and one part fine YSZ.

The test method, which is used for the characterization of the anode material of the invention, can be summarized as follows:

The test method is carried out at a temperature which is at least the same as the operating temperature of the fuel cell (900° C.).

A linear elongation of the sample is measured in the oxidized state of the second reticular system and a value $L_1$ is determined. (The value $L_1$ can be regarded as an approximately constant value.)

The second reticular system is reduced and is oxidized again after at least one hour.

A value $L_2$ of the linear elongation (likewise approximately constant) is determined for the newly oxidized state.

One obtains the specific value of the irreversible change in length as the ratio $(L_1-L_2):L_1$. In accordance with the invention the specific value must be smaller than 0.002, preferably smaller than 0.0005.

In the test method a plurality of redox cycles are advantageously carried out. In this connection the number of redox cycles amounts to at least five; preferably it is larger by one order of magnitude, i.e. by around the factor 10.

Outside the anode layer 1a the micro-pores and macro-pores of the carrier structure are uniformly distributed. For the macro-pores the volume ratio amounts to 15-35, preferably more than 20% by volume; for the micro-pores it preferably amounts to less than 10% by volume. The average diameters of the macro-pores have values between 3 and 25 μm, while those of the micro-pores have values between 1 and 3 μm. The carrier structure 1 has a layer thickness of 0.3 to 2 mm, preferably 0.6 to 1 mm. The thickness of the electrolyte layer is smaller than 30 μm, preferably smaller than 15 μm.

In a method for the manufacture of the fuel cell in accordance with the invention the metal for the second phase is used in oxidized form in the production of a blank for the carrier structure. The material for the solid electrolytes is applied as a slurry to the blank by means of a thin layer process for example. Subsequently the coated blank is sintered. One of the following part methods can be used for the production of the carrier structure for example: foil casting, roll pressing, wet pressing or isostatic pressing. The thin layer electrolyte can be applied by other methods: screen printing, spraying or casting of slurry, slurry casting in a vacuum (vacuum slip casting) or reactive metallization.

As already mentioned the anode material of the invention can also be used to advantage in a fuel cell in which, for example, the solid electrolyte layer is formed as a carrier for electrode layers. The electrolyte layer thereby separates the anode layer from a cathode layer in gas-tight manner. The anode layer applied at the fuel side includes the heterogeneous phase with the two reticular systems. Through the stabilization of the heterogeneous phase, the metric characteristics of the anode layer at the boundary surface to the electrolyte layer are largely preserved, so that only weak shear forces arise which do not cause any de-lamination of the anode layer. Instead of the electrolyte layer the cathode layer, or a foam-like metal layer, can also form a carrier structure.

The invention claimed is:

1. An anode material for a fuel cell which is to be operated at a high temperature above 700° C., said anode material being a porous composite material with a heterogeneous phase of solid materials which is formed by two reticular systems which penetrate each other in interlaced manner of particles connected by sintering, namely a first reticular system of ceramic material, and a second reticular system of metallic material for the purpose of bringing about redox processes and an electrical conductivity, wherein the first reticular system is composed of large and small ceramic particles with average diameters $d_{50}$ greater than 5 μm or smaller than 1 μm respectively, wherein 50 to 80% of the first reticular system is formed from the large ceramic particles, and wherein the anode material formed by the first and second reticular systems has an irreversible change in length smaller than 0.002, determined by means of a test method in which the following measurements and evaluations are carried out at a temperature which is at least the same as the operating temperature of the fuel cell:

a linear elongation of a sample of the anode material is measured in the oxidized state of the second reticular system and a value $L_1$ is determined;

the second reticular system is reduced, is oxidized again after at least one hour, and a value $L_2$ of the linear elongation is determined for the newly oxidized state, and the irreversible change in length is obtained as the ratio $(L_1-L_2):L_1$, wherein anode material standing in connection with an electrolyte layer forms a heterogeneous phase composed of the two reticular systems; wherein the large and small ceramic particles form "burr corpuscles" of stable shape, which are dispersed in insular manner in the heterogeneous phase; and wherein the "burr corpuscles" are associated into a "adherent burr composite" through which the heterogeneous phase is stabilized against changes of shape, with dimensional characteristics of the heterogeneous phase remaining largely intact at a boundary surface to the electrolyte layer through this stabilization.

2. An anode material in accordance with claim 1, wherein in the test method a plurality of redox cycles is carried out, with the number of redox cycles amounting to at least five.

3. An anode material in accordance with claim 1, wherein the first reticular system consists of zirconium oxide YSZ, stabilized with Y, of doped ceroxide, of a perovskite, or of another ceramic material, and the second reticular system contains Ni as metal.

4. An anode material in accordance with claim 3, wherein the second reticular system consists, in the presence of the oxidized form of the metal, wholly or largely of NiO particles joined together by sintering.

5. An anode material in accordance with claim 3, wherein the quantity ratio between the first and second reticular systems—in percentage by weight—lies in the range from 50:50 to 25:75.

6. An anode material in accordance with claim 5, wherein the quantity ratio between the first and second reticular systems—in percentage by weight—lies in the range of around 40:60.

7. An anode material in accordance with claim 3, wherein the second reticular system contains Ni as metal to which Cu is alloyed.

8. A fuel cell in accordance with claim 1, wherein a carrier structure at the fuel side including an anode layer is formed as a carrier for a gas-tight, sintered, solid material electrolyte layer; wherein this carrier structure includes the heterogeneous phase and hollow cavities formed by this phase in the form of macro-pores and also micro-pores; and wherein the dimensional characteristics of the carrier structure remain intact at the boundary surface to the electrolyte layer through the stabilization of the heterogeneous phase, so that volume changes of the second reticular system during the redox cycle leave the gas-tightness of the electrolyte layer unimpaired.

9. A fuel cell in accordance with claim 8, wherein the carrier structure has a layer thickness of 0.3 to 2 mm; wherein the thickness of the electrolyte layer is smaller than 30 µm; and wherein the micro-pores and macro-pores of the carrier structure are uniformly distributed outside of the anode layer, with the volume percentage for the macro-pores amounting to 15 to 35%, and with the average diameter of the macro-pores having values between 3 and 25 µm, whereas those of the micro-pores have values between 1 and 3 µm.

10. A fuel cell in accordance with claim 8, wherein in the production of a blank for the carrier structure on which the solid material electrolyte layer is applied in slurry-like manner by means of a thin layer process, the metal of the second reticular system is used in the oxidized form in this, and the blank together with the applied electrolyte material is sintered; or wherein one of the following part processes is used for the production of the layer used as a carrier: slurry casting, foil casting, roll pressing, wet pressing or isostatic pressing.

11. A fuel cell in accordance with claim 10, wherein said thin layer process is a screen printing.

12. A fuel cell in accordance with claim 1, wherein a solid electrolyte layer is formed as a carrier for electrode layers and separates an anode layer from a cathode layer in gas-tight manner; or wherein the cathode layer, or a metal foam layer, forms a carrier structure having a fuel side, wherein the anode layer applied to the fuel side forms the heterogeneous phase with the two reticular systems; and wherein through the stabilization of the heterogeneous phase the dimensional characteristics of the anode layer at the boundary surface to the electrolyte layer remain largely intact, so that only shear forces arise which do not cause any delamination of the anode layer.

13. An anode material in accordance with claim 2, wherein said number of redox cycles is larger than 10.

14. An anode material in accordance with claim 1, wherein the anode material formed by the first and second reticular systems has an irreversible change in length smaller than 0.0005.

15. A fuel cell in accordance with claim 1, wherein the carrier structure has a layer thickness of 0.6 to 1 mm.

16. A fuel cell in accordance with claim 1, wherein the thickness of the electrolyte layer is smaller than 15 µm.

17. A fuel cell in accordance with claim 1, wherein the volume percentage for the macro-pores amounts to more than 20%.

18. A fuel cell in accordance with claim 1, wherein the volume percentage for the micro-pores amounts to less than 10%.

* * * * *